United States Patent Office 3,304,310
Patented Feb. 14, 1967

3,304,310
CERTAIN ANTHRAQUINONETHIAZOLE COMPOUNDS
Istvan Hari and Max Staeuble, Basel, Switzerland, assignors to Ciba Limited, Basel, Switzerland, a Swiss company
No Drawing. Filed June 11, 1962, Ser. No. 201,247
Claims priority, application Switzerland, June 12, 1961, 6,894/61; June 21, 1961, 7,269/61; May 15, 1962, 5,832/62
2 Claims. (Cl. 260—303)

The present invention provides vat dyestuffs which contain at least one carboxylic acid group, at least 5 fused rings or at least 2 anthraquinone units, and at least one acylamino group derived from a cyclic, that is to say, an alicyclic, heterocyclic or advantageously aromatic, carboxylic acid. The invention provides more especially vat dyestuffs of this kind which are free from mercapto groups and contain an aromatically bound carboxylic acid group as is the case, for example, in a carboxyaroylamino group.

The term "vat dyestuffs" includes dyestuffs capable of conversion by reduction into a so-called leuco form or vat which has a better affinity for natural and regenerated cellulose fibers than has the non-reduced form, and which can be reconverted by oxidation into the original chromophoric system. As suitable vat dyestuffs there may be mentioned, more especially, those of the anthraquinone series, for example, those which contain a 9:10-dioxoanthracene ring and at least two fused carbocyclic or heterocyclic rings, or which consists of a plurality of anthraquinone units, which consist of simple 9:10-dioxoanthracene rings or anthraquinone radicals that contain 4 fused rings, such as the benzanthrone ring. There may also be mentioned vat dyestuffs of the pyrene-quinone series, the perylene tetracarboxylic acid imide series and the naphthalene tetracarboxylic acid series. In addition to at least one carboxylic acid group, the dyestuffs may contain substituents that are usual in vat dyestuffs, for example, halogen atoms, alkoxy or alkyl groups, halogenated triazinyl or acrylamino or pyrimidinylamino groups, sulfone or sulfonamide groups such as sulfonic acid chloroalkylamide or sulfato-alkylamide groups. However, they must contain at least one cyclic acylamino group, advantageously an acylamino group derived from an aromatic dicarboxylic acid.

The invention also provides a process for the manufacture of the aforesaid dyestuffs, wherein (a) a vat dyestuff which contains at least one acylatable amino group, especially an —NH$_2$ group, and at least 5 fused rings or at least 2 anthraquinone units, is mono-acylated at the amino group with an anhydride of a cyclic dicarboxylic acid or with a cyclic carboxylic acid halide containing a carboxylic acid group, or (b) a vat dyesuff which contains at least 5 fused rings or at least 2 anthraquinone radicals and, in at least one cyclic acylamino group, at least one functionally converted carboxylic acid group convertible by hydrolysis into a carboxylic acid group, such as a carboxylic acid ester group, a nitrile group or a carboxylic acid halide group, is subjected to hydrolysis, or (c) a vat dyestuff which contains at least one carboxylic acid halide group and at least 5 fused rings or at least 2 anthraquinone radicals is amidated with a heterocyclic or aromatic amine containing a carboxylic acid group, or (d) aminoanthraquinones which contain carboxylic acid groups and acylatable amino groups are linked together by means of a halide or anhydride of an aromatic or heterocyclic polycarboxylic acid, or (e) aminoanthraquinones which contain a carboxylic acid group and an acylamino group are linked together by a heterocyclic ring, more especially by condensation with a polyhalogenated heterocyclic compound, such as halogen-triazine.

As starting materials for method (a) of the process there are used vattable amines, such as 4-aminoanthraquinone-2:1(N)-acridones, 4:4'-, 4:5'- or 5:5'-diamino-1:1'-dianthrimidecarbazole, aminopyranthrones, mono- or di-aminoacedianthrone, amino-isodibenzanthrone, aminodibenzanthrone, aminoanthanthrone, aminoflavanthrone, aminopyranthrone, 4- or 5-amino-1:1'-dianthrimidecarbazole, aminodibenzpyrene-quinone, or mono- and di-amino-trianthrimide-carbazoles, for example, 8':8''-diamino-1':1:5:1''-trianthrimide-carbazole, and perylene tetracarboxylic acid di-(para- or meta-aminophenyl)-imide, compounds of the formulae

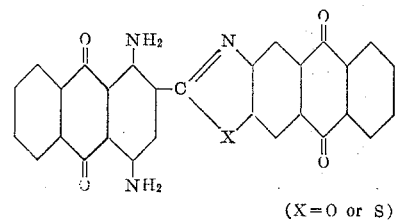

(X = O or S)

and

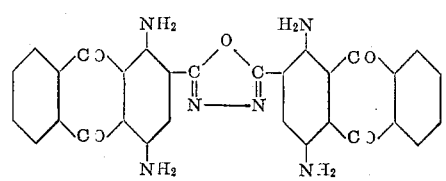

and of the formula

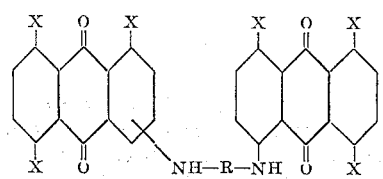

in which at least four of the symbols X represent hydrogen atoms and the remainder represent —NH$_2$ groups, R represents a triazine radical or a —CO—R'—CO— group, in which R' is a heterocyclic or, if desired, aromatic radical which is derived, for example, from a phthalic acid, a naphthalene dicarboxylic acid, a diphenyl dicarboxylic acid, an azobenzene- or azodiphenyl-dicarboxylic acid, a fluoranthene dicarboxylic acid, an anthraquinone dicarboxylic acid, a diphenylsulfone- or diphenylstilbene-dicarboxylic acid, a triazine dicarboxylic acid, quinoline-, thianthrene- or diphenylene-oxide-dicarboxylic acid or a pyrimidine- or thiophene-dicarboxylic acid; and also vat dyestuffs that contain a benzoylamino group, such as amino-benzoylamino-anthrimide-carbazoles, for example, 4 - amino - 5' - benzoylamino - dianthrimide-carbazole or 4 - amino - 4' - benzoylamino-dianthrimidecarbazole.

As acylating agents that contain at least one carboxyl group there may be used halides of cyclic dicarboxylic acids, such as those of the phthalic acids, napththalene di- or tetra-carboxylic acids, anthanthrone dicarboxylic acid, fluoranthene dicarboxylic acid, thianthrene dicarboxylic acid, diphenyl dicarboxylic acid, diphenylsulfone-dicarboxylic acids, diphenyl-stilbene-dicarboxylic acids, di - (carboxyphenylamino)-1:3:5-triazines, di-(carboxyphenyl)-1:3:5-triazines, diphenylene oxide dicarboxylic acid, benzanthrone dicarboxylic acid, pyridine dicarboxylic acids, thiophene dicarboxylic acids, benzthiazole di-carboxylic acids, quinoline dicarboxylic acid, and also halides of the benzoic acids.

The reaction of the vattable amine with the acylating agent may be carried out in an inert organic solvent, for example, nitrobenzene, chlorobenzene or ortho-dichlorobenzene, at a raised temperature. It may also be carried out in a tertiary base, for example, an anhydrous or almost anhydrous pyridine base or in pyridine. The molar ratios of the components are advantageously so chosen that acylaminoderivatives are formed whose acylamino groups contain a carboxylic acid group. When these acylamino-derivatives also contain acylatable amino groups, they may be further reacted with dihalogen-compounds, for example, dihalogen-triazines, dihalogenpyrimidines or dicarboxylic acid dihalides, to form condensation products that contain two anthraquinone nuclei.

By using as acylating agents carboxylic acid halides that contain, instead of a carboxylic acid group, a functionally converted carboxylic acid group, for example, a nitrile group, a carboxylic acid ester group or a carboxylic acid halide group, there are obtained vat dyestuffs containing carboxylic acid halide groups which can be used as starting materials for method (b) of the process. They can be converted into the vat dyestuffs of the invention by mild hydrolysis, for example, with an alkali metal hydroxide or alkali metal carbonate in an aqueous medium.

As starting materials for method (c) of the process there are used the same carboxylic acid halides as in method (b), which are obtained by acylation, and also carboxylic acid chlorides, such as anthanthrone dicarboxylic acid dichloride or perylene tetracarboxylic acid dianilide dicarboxylic acid dihalides of the formula

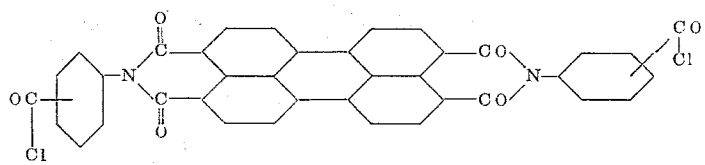

As amines that are to be condensed to carbamides with the said carboxylic acid chlorides in the process of the invention, there may be mentioned more especially vattable amines and, if vat dyestuff carboxylic acid chlorides are used as starting materials, aminonaphthalene carboxylic acids, aminodiphenyl carboxylic acids, and especially ortho-, meta- or para-aminobenzoic acid. The condensation is carried out by known methods in an aqueous or organic medium with the application of heat in the presence of an agent capable of binding acid, such as sodium acetate, sodium carbonate, sodium hydroxide, potassium hydroxide or a tertiary organic base or the like.

As acylatable aminoanthraquinone carboxylic acids used as starting materials for method (d) of the process there may be mentioned, for example, 4-, 5- or 6-aminoanthraquinone-1-carboxylic acid, 1-, 3- or 5-aminoanthraquinone-2-carboxylic acid and 4- or 5-(2'-, 3'- or 4'-carboxybenzoylamino) - 1 - aminoanthraquinone. As halides of polycarboxylic acids there are used, for example, the chlorides of 2:5-thiophene dicarboxylic acid of iso- or tere-phthalic acid, of naphthalene dicarboxylic acids, of diphenyl dicarboxylic acids, of azobenzene- or azodiphenyl-dicarboxylic acids, of fluoranthene- or anthraquinonedicarboxylic acids, of diphenyl sulfone- or diphenyl-stilbene-dicarboxylic acids, or triazine dicarboxylic acids or quinoline-, thianthrene- or diphenylene oxide-dicarboxylic acids.

The carboxybenzoylamino-anthraquinone compounds mentioned in the preceding paragraph may also be condensed to form vat dyestuffs of the invention by method (e) of the process, for example, with di- or tri-chloro-1:3:5-triazines or tetrachloro- or tetrabromo pyrimidines.

In methods (d) and (e) an asymmetrical condensation, for example, with a starting material which contains a carboxylic acid group and a starting material which is free from carboxylic acid group. In this manner there are obtained less hydrophilic, but still valuable vat dyestuffs.

The dyestuffs of the invention are suitable for dyeing or printing a very wide variety of materials, but especially for dyeing or printing textile materials of natural or regenerated cellulose by the usual vat dyeing or printing methods. The dyeings and prints produced therewith are generally fast to chlorine and are distinguished by their excellent fastness to light and excellent properties of wet fastness, especially by their good fastness to soda boiling.

The dyeings produced with the dyestuffs of the invention are fast to dry cleaning and migration. The dyed fabrics can therefore be coated with synthetic resins, for example, polyvinyl chloride, without the dyestuff migrating into the resin, which is particularly important in the manufacture of artificial leather.

As compared with the conventional vat dyestuffs, the vat dyestuffs of the invention have a better levelling and penetrating power. When used for dyeing in circulating liquor machines they do not give rise to faulty dyeings caused by the precipitation of reoxidized dyestuff even when foam is formed, and the pigmenting operation that is necessary in dyeing wound packages, for example, cheeses, or in dyeing tricots on a winch machine, with the conventional vat dystuffs, is omitted in the case of the dyestuffs of the invention.

They can also be used in the form of at least colloidal solutions in the fast-running pad-dyeing processes and, in this case they do not have to be in a finely dispersed commercial form in the form of special pastes, so that the disadvantges of such forms (instability of the paste, dusting, and the need for several operations to prepare finely divided powders) are eliminated. Finally, they can generally be vatted very easily, often at room temperature and, if required with mild reducing agents. They possess a very good solubility in the vat, and yield strong and very level dyeings especially on regenerated cellulose that exhibit the same tint as the corresponding dyeings on cotton.

The following examples illustrate the invention, the parts and percentages being by weight unless otherwise stated, and the relationship of parts by weight to parts by volume is the same as that of the kilogram to the liter:

*Example 1*

6 parts of isophthalic acid dichloride are dissolved in 50 parts of dry nitrobenzene. To the solution so obtained are added 3.1 parts of the dyestuff intermediate product of the formula

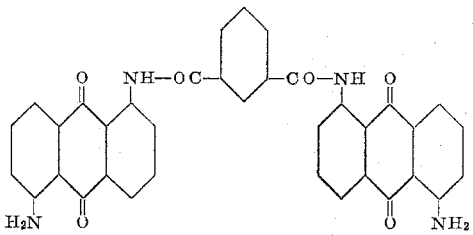

(obtainable by condensing 1 mol of isophthalic acid dichloride with 2 mols of 1-amino-5-nitroanthraquinone and subsequent reduction), and the whole is heated to 130° C., while stirring well, in the presence of 0.2 part of pyridine. The acylation is carried out for 6 hours at 130 to 135° C. and, after cooling the reaction mixture, the reaction product is isolated by filtration. The isolated product is washed successively with nitrobenzene and acetone, and is then reduced at 40 to 50° C. in a solution containing, per liter of water, 8 parts of hydrosulfite and 15 parts of sodium hydroxide solution of 30% strength. The dyestuff of the formula

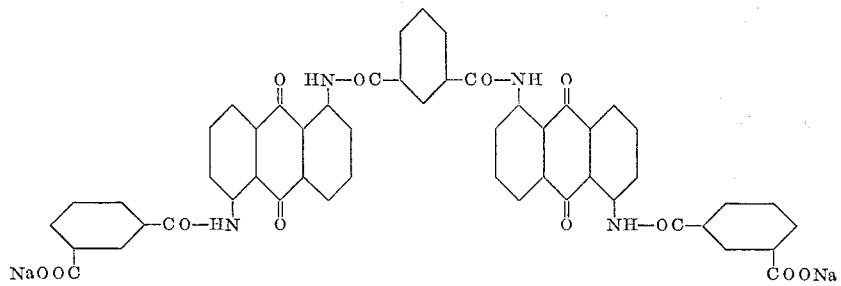

is obtained by blowing air into the reaction mixture, and then isolating the dystuff by filtration. It is very easily vatted, and dyes cotton and regenerated cellulose yellow tints possessing very good properties of wet fastness and which exhibit very good dyestuff penertation.

*Dyeing prescription.*—0.75 part of the above dyestuff is suspended in 250 parts of water. The dyestuff suspension so obtained is introduced into a solution, having a temperature of 35° C., of 10 parts by volume of aqueous sodium hydroxide solution of 30% strength and 6 parts of sodium hydrosulfite in 1750 parts of water, whereupon vatting takes place instantaneously. In the dyebath so obtained, 50 parts of cotton are dyed for 45 minutes at 30 to 40° C. in the presence of 60 parts of sodium chloride. After the dyeing operation, the dyeing is oxidized, washed, acidified, well rinsed, soaped at the boil, rinsed again, and then dried.

Example 2

To a suspension of 1.44 parts of 4:4'-diamino-1:1'-dianthrimide-carbazole in 60 parts of nitrobenzene are added, at 120° C., 1.3 parts of para-carboxybenzoyl chloride [C. S. Marvel, E. A. Kraiman, J. Org. Chem. 18, 1664 (1953)], the whole is stirred for 30 minutes at 165° C. and then cooled. The crystalline dyestuff so obtained and having the formula

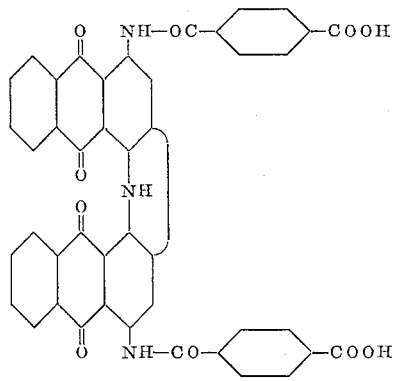

is isolated by suction filtration, washed with hot alcohol, and then dried.

It dyes cotton and regenerated cellulose grey tints possessing excellent properties of wet fastness when applied, for example, according to the dyeing prescription given in the last paragraph of Example 1.

Example 3

To a fine suspension of 2.0 parts of amino-dibenzanthrone in 80 parts of nitrobenzene is added, at 140° C., 0.9 part of para-carboxybenzoyl chloride, the whole is stirred for 1 hour at 170° C., 0.2 part of pyridine is then added, and stirring is continued for 24 hours at 165° C. After cooling the reaction mixture, the crystalline dyestuff so obtained and having the formula

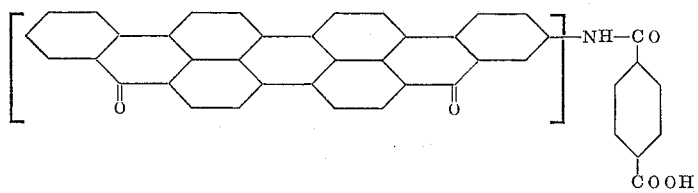

is isolated by suction filtration, boiled with ethyl alcohol, again isolated by suction filtration, and dried.

When applied by the dyeing prescription given in the last paragraph of Example 1, the dyestuff so obtained dyes cotton and regenerated cellulose blue-black tints possessing very good wet fastness to light.

Example 4

To a fine suspension of 2.2 parts of aminoacedianthrone in 70 parts of nitrobenzene is added, at 120° C., 1.0 part of para-carboxybenxoyl chloride, the whole is stirred for 1 hour at 165° C., 0.2 part of pyridine is then added, and stirring is continued for 24 hours at that temperature. The crystalline dyestuff so obtained and having the formula

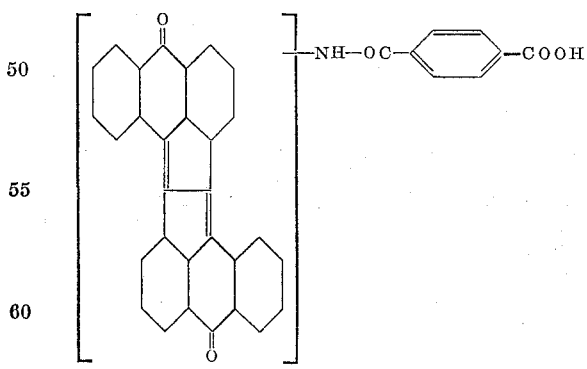

is isolated by suction filtration, washed with hot ethanol, and then dried.

When applied, for example, by the dyeing prescription given in the last paragraph of Example 1, the dyestuff so obtained dyes cotton and regenerated cellulose brown tints possessing excellent properties of wet fastness and fastness to light.

Example 5

3.9 parts of 1-amino-5-(4'-carboxybenzoylamino)-anthraquinone are finely suspended in 60 parts of nitrobenzene and 4 parts of diethylaniline. To the suspension so obtained is added, at 120° C., 1.0 part of cyanuric chloride, the whole is stirred for 6 hours at 140° C. and then allowed to cool. The dyestuff of the formula

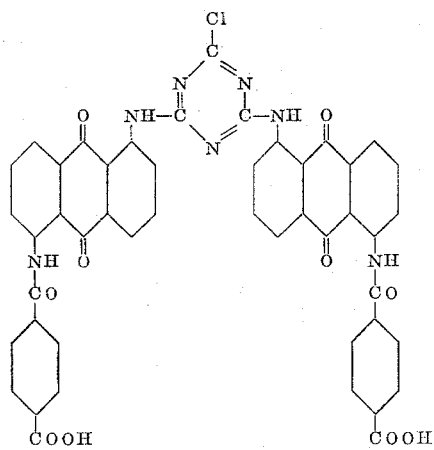

is isolated by suction filtration, washed with ethanol and ether, and then dried.

When applied, for example, by the method given in the last paragraph of Example 1 the dyestuff so obtained dyes cotton and regenerated cellulose yellow tints possessing excellent properties of wet fastness, excellent fastness to light and excellent fastness to solvents.

The amine used as starting material can be prepared as follows:

To a suspension of 6.8 parts of 1-nitro-5-(4'-carboxy-benzoylamino)-anthraquinone in 500 parts of water are added, at 60° C., 50 parts by volume of sodium hydroxide solution of 30% strength and 20 parts of sodium hydrosulfite. The vat so formed is filtered hot, cooled, and then oxidized with air. The precipitate is isolated by suction filtration, washed with a small amount of water and then dried. The dark red-brown sodium salt of the amino-carboxylic acid is dissolved in 75 parts of concentrated sulfuric acid, and the resulting pale yellow solution is poured into 300 parts of ice water. The dark red precipitate is isolated by suction filtration, washed until the washings run neutral, and then dried.

*Example 6*

To a fine suspension of 4.64 parts of the compound of the formula

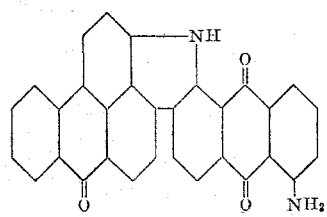

in 150 parts of nitrobenzene are added, at 120° C., 1.85 parts of para-carboxybenzoyl chloride, the whole is stirred for 30 minutes at 165° C. and then cooled. The isolated dyestuff of the formula

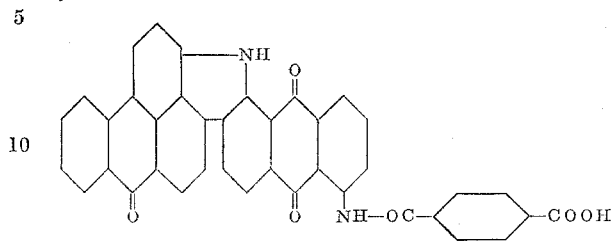

is boiled in ethanol, isolated by suction filtration, and then dried. When applied by the method described in Example 1 the dyestuff so obtained dyes cotton and regenerated cellulose green-olive tints possessing excellent properties of fastness.

*Example 7*

To a fine suspension of 7.32 parts of the compound of the formula

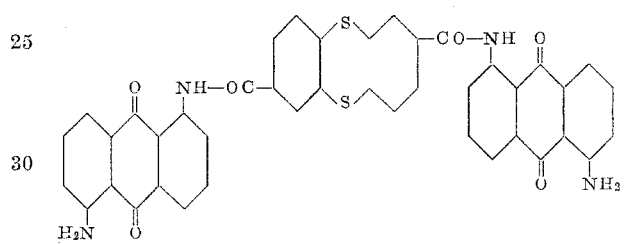

in 150 parts of nitrobenzene are added, at 120° C., 1.85 parts of para-carboxybenzoyl chloride, and the whole is stirred for 30 minutes at 170° C. The isolated dyestuff of the formula

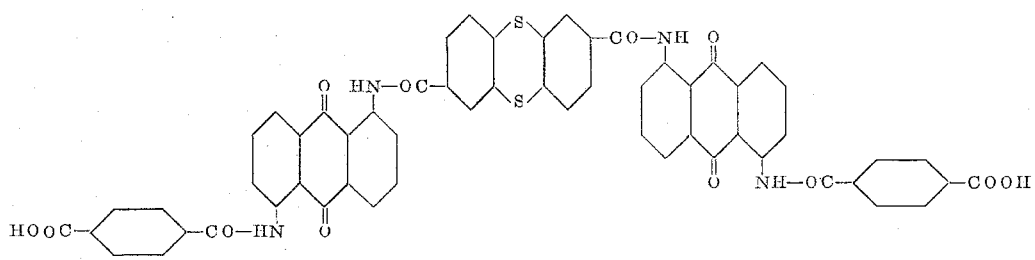

is boiled in ethanol, isolated by suction filtration and dried. When applied by the method described in Example 1 the dyestuff so obtained dyes cotton and regenerated cellulose yellow tints possessing excellent properties of the fastness.

*Example 8*

8 parts of 1:5-naphthalene-dicarboxylic acid dichloride [G. Loch, M. 81, 853 (1950)] are dissolved in 50 parts of dry nitrobenzene at 50° C. to the solution so obtained are added 3.1 parts of the dyestuff intermediate product of the formula

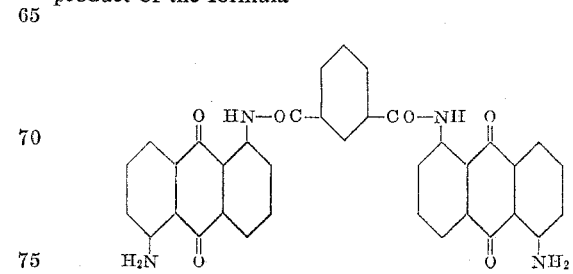

(obtainable by condensing 1 mol of isophthalic acid dichloride with 2 mols of 1-amino-5-nitroanthraquinone and subsequent reduction), and the whole is heated to 130° C., while stirring well, in the presence of 0.2 part of pyridine. The acylation is carried out for 12 hours at 130 to 135° C. and, after cooling the reaction mixture to 50° C., the reaction product is isolated by filtration. The filter residue is washed successively with nitrobenzene and acetone, and then vatted at 40 to 50° C. in a solution containing, per liter of water, 8 parts of hydrosulfite and 15 parts of sodium hydroxide solution of 30% strength. The dyestuff of the formula

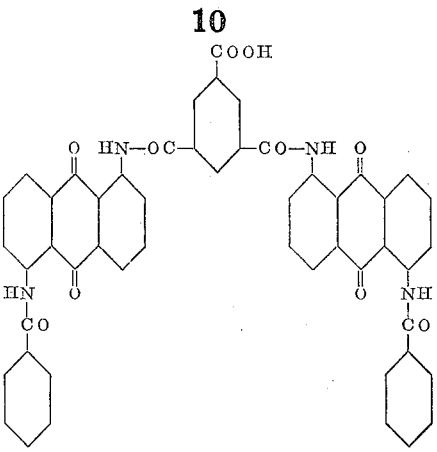

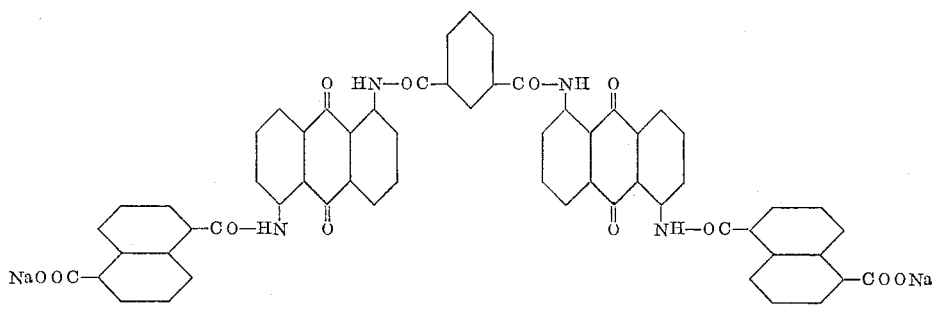

which is recovered from the vat by blowing air into the reaction mixture, and subsequent isolation by filtration, dyes cotton and regenerated cellulose yellow tints possessing very good properties of fastness.

*Example 9*

To a fine suspension of 2.18 parts of diamino-acedianthrone in 70 parts of nitrobenzene are added, at 120° C., 1.9 parts of para-carboxybenzoyl chloride, and the whole is stirred for 1 hour at 165° C. and then cooled. The isolated dyestuff of the formula

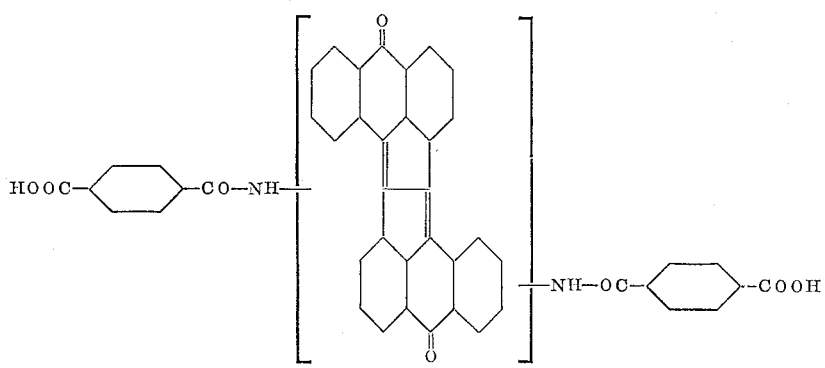

is boiled in ethanol, isolated by suction filtration and then dried. It is in the form of a dark brown powder that dyes cotton and regenerated cellulose dark brown tints possessing very good properties of fastness from a brownish violet vat when applied by the method given in Example 1.

*Example 10*

To a solution of 3.42 parts of 1-amino-5-benzoylamino-anthraquinone in 60 parts of ortho-dichlorobenzene are added, at 120° C., 1.3 parts of 5-carboxy-isophthalic acid chloride, and the whole is stirred at that temperature for 30 minutes and then allowed to cool. The dyestuff of the formula which precipitates, is isolated by suction filtration, boiled in ethanol, again isolated by suction filtration and then dried. It is an orange-yellow powder that dyes cotton and regenerated cellulose very pure, fast tints of high tinctorial strength when applied by the method given in Example 1.

The 5-carboxy-isophthalic acid chloride can be prepared as follows:

To a solution of 9.9 parts of trimesic acid chloride (B.P. 178° C. under a pressure of 10 mm. of mercury) in 70 parts of absolute ether is added 0.75 part of water, and the whole is boiled for 64 hours under reflux. The ether is then distilled off in vacuo. The residue is suspended in a small amount of ligroin, isolated by suction filtration, and then dried. The product so obtained is readily soluble in benzene and melts at 105° C. with decomposition.

*Example 11*

To a fine suspension of 2.28 parts of 4:4'-diamino-1:1'-dianthrimide-carbazole in 60 parts of nitrobenzene are added, at 120° C., 2.0 parts of 2-carboxythiophene-5-carboxylic acid chloride and the whole is stirred for 1 hour at 165° C. and then allowed to cool. The isolated dyestuff of the formula

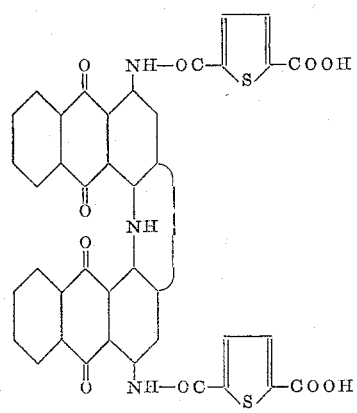

is boiled in ethanol, isolated by suction filtration, and then dried. It is in the form of a black powder that dyes cotton and regenerated cellulose pure olive tints possessing excellent properties of fastness when applied by the dyeing method given in Example 1.

The 2-carboxy-thiophene-5-carboxylic acid chloride can be prepared as follows:

To a solution of 13.9 parts of thiophene-2:5-dicarboxylic acid dichloride (M.P. 144° C.) in 120 parts of absolute ether are added in portions 1.4 parts of water, the whole is boiled for 48 hours under reflux, cooled, and then filtered. The ether is then distilled off in vacuo. The residue is suspended in 30 parts of ligroin and then isolated by suction filtration. The product so obtained is a white powder containing chlorine and melting at 144° C. with decomposition.

*Example 12*

To a fine suspension of 2.86 parts of the compound of the formula

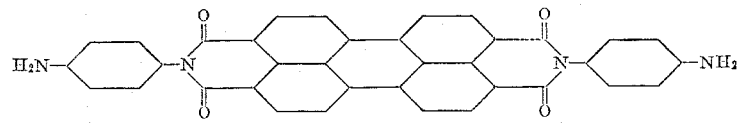

in 70 parts of nitrobenzene are added at 120° C., 2.7 parts of 3:5-dicarboxybenzoyl chloride, the whole is stirred for 30 minutes at 165° C., and then cooled. The isolated dyestuff of the formula

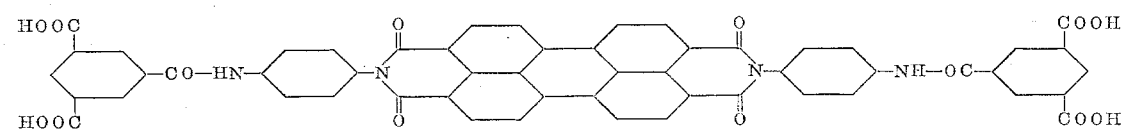

is boiled in ethanol, isolated by suction filtration and then dried. It is in the form of a purplish red powder that dyes cotton and regenerated cellulose pure and strong bright red tints possessing very good properties of fastness when applied by the method described in Example 1.

The 3:5-dicarboxybenzoyl chloride can be prepared as follows:

To a solution of 19.8 parts of trimesic acid (B.P. 178° C. under a pressure of 10 mm. of Hg) in 140 parts of absolute ether are added 1.5 parts of water, the whole is boiled for 48 hours under reflux, then a further 1.5 parts of water are added, and boiling is continued for a further 48 hours under reflux. The solution is then cooled and filtered. The ether is distilled off in vacuo. The residue is suspended in 60 parts of benzene, the whole is boiled for a short time, and the product is isolated by suction filtration and dried. The product so obtained is a pure white powder containing chlorine and melting at 210° C. with decomposition.

*Example 13*

To a fine suspension of 2.5 parts of 2-(1':4'-diamino-2'-anthraquinonyl)-5:6-phthalyl-benzthiazole in 70 parts of nitrobenzene is added, at 120° C., 1.0 part of para-carboxybenzoyl chloride, and the whole is stirred for 4 hours at 160° C., then for 1 hour at 180° C. and then cooled. The isolated dyestuff of the formula

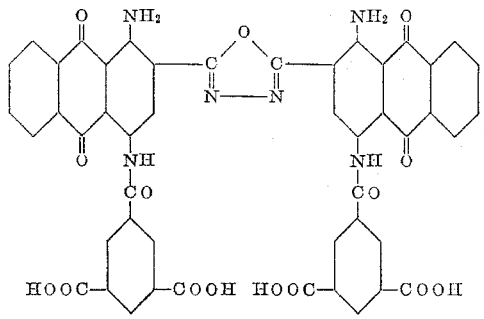

is boiled in ethanol, isolated by suction filtration, and then dried. It is a dark blue powder that dyes cotton and regenerated cellulose very fast blue tints when applied by the dyeing prescription given in Example 1.

*Example 14*

A fine suspension of 1.3 parts of 2:5-bis-(1':4'-diamino-2'-anthraquinonyl)-1:3:4-oxadiazole and 1.2 parts of 3:5-dicarboxybenzoyl chloride in 40 parts of nitrobenzene is heated to 170 to 175° C. in the course of one hour. It is stirred at that temperature for one hour, then 0.5 part by volume of anhydrous pyridine is added, stirring is continued for 2 hours at 170 to 175° C., and the reaction mixture is then allowed to cool. The isolated dyestuff of the formula is boiled in ethanol, isolated by suction filtration and then dried. It is in the form of a dark blue powder that dyes cotton and regenerated cellulose pure and fast blue tints of high tinctorial strength when applied by the dyeing prescription given in Example 1.

*Example 15*

5.4 parts of 1-amino-5-nitroanthraquinone are dissolved in 150 parts of dry nitrobenzene at 120° C., and to the solution so obtained are added 4.1 parts of paracarboxybenzoyl chloride. The condensation product precipitates slowly in the form of yellow lamellae. The whole is stirred for 4 hours at 120 to 125° C. and then for 2 hours at 140 to 145° C. After cooling the reaction mixture, the condensation product is isolated by filtration and washed with alcohol. The nitro-derivative so obtained can be reduced to the amine of the formula

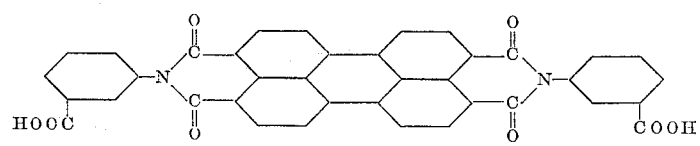

by known methods, for example, by heating it with phenylhydrazine in ortho-dichlorobenzene to 160 to 165° C.

40 parts of benzoic acid-meta-sulfochloride are then converted into the corresponding meta-sulfobenzoic acid dichloride by heating in 100 parts of dry nitrobenzene with 3 parts of thionyl chloride, and the excess of thionyl chloride is distilled off in vacuo. 5.7 parts of the above amine are then added in small portions, and the whole is heated for 4 hours at 120 to 125° C. while stirring, and then for a further 4 hours at 140 to 145° C. To the acylation product so obtained are then added, dropwise, 4 parts of thionyl chloride and 0.1 part of pyridine, the whole is heated for 4 hours at 120 to 130° C., and then 4 parts of 1-amino-5-nitro-anthraquinone are added. Condensation is continued for 6 hours at 140 to 145 C., and the resulting intermediate product of the formula

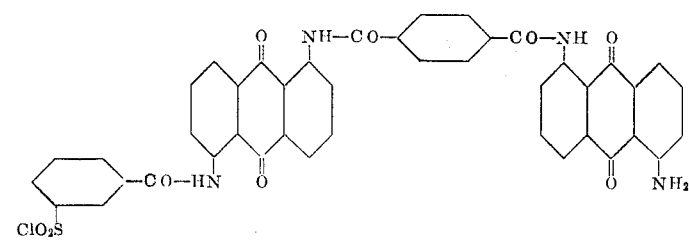

is isolated by filtration. By vatting the product in a solution that contains, per liter, 20 parts by volume of sodium hydroxide of 30% strength and 16 parts of sodium dithionite, and blowing the leuco-compound with air, there is obtained the compound of the formula

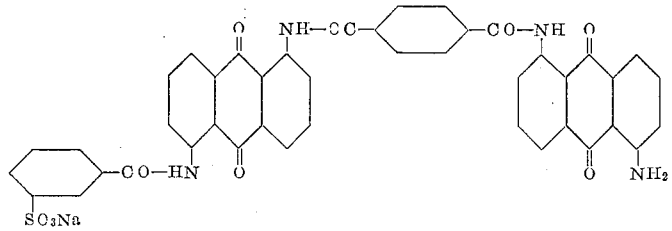

7 parts of the compound so obtained are heated to 90° C. in 100 parts of N-methylpyrrolidone, and 2 parts of paracarboxybenzoyl chloride are then added. Acylation is carried out for 4 hours at 90 to 95° C. and then for 2 hours at 120 to 125° C. After cooling the reaction mixture, it is filtered, the residue is washed with water and, while still moist, is pasted with 6 parts of sulfite cellulose waste liquor in a ball mill. The paste so obtained is dried in vacuo. There is obtained a water-soluble dyestuff which, in the form of the free acid, corresponds to the formula

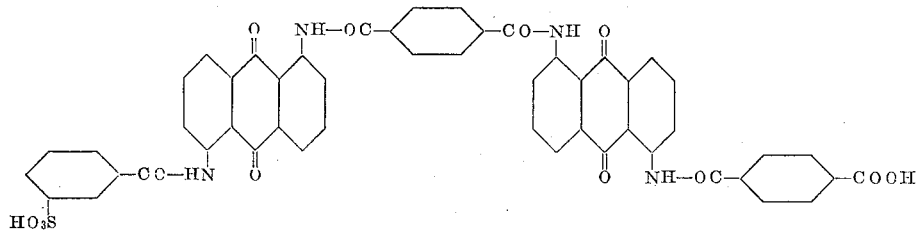

and which dyes cotton from a hydrosulfite vat yellow-brown tints that are fast to washing and soda-boiling.

*Example 16*

12.6 parts of the product of the formula are suspended in 120 parts of dry nitrobenzene, and to the suspension so obtained are added 12 parts of thionyl chloride and 0.5 part of anhydrous pyridine. The reaction mixture is heated to 95° C. while stirring, and is maintained for 2 hours at 95 to 100° C., then for 1 hour at 130 to 135° C., and then for a further ½ hour at 170 to 175° C. The excess of thionyl chloride is distilled off in vacuo at 120° C., and to the reaction mixture are added 16 parts of 1-amino-5-nitroanthraquinone, and condensation is carried out for 6 hours at 150 to 155° C. After cooling the reaction mixture to room temperature, the condensation product is filtered off, washed with nitrobenzene and methanol, and then dried in vacuo at 90° C.

For reduction of the nitro group, 11.3 parts of the resulting condensation product in 150 parts of orthodichlorobenzene are converted into the corresponding diamine with 11 parts of phenyl-hydrazine at 160 to 165° C., while stirring, and the diamine is isolated by filtration and dried.

4.3 parts of the diamine so obtained are suspended in 100 parts of dry nitrobenzene, and to the suspension so obtained are added 3 parts of para-carboxybenzoyl chloride and 0.1 part of pyridine, and the acylation is carried out for 6 hours at 165 to 170° C. After cooling the reaction mixture to room temperature, the dyestuff is isolated by filtration, washed with nitrobenzene and acetone, and then introduced into a solution containing 8 parts by volume of sodium hydroxide solution of 30% strength and 6 parts of sodium dithionite in 500 parts of water, and dyestuff is vatted therein at 40 to 45° C. The dyestuff is then reoxidized by blowing in air, and is then isolated in the form of its disodium salt by filtration. The moist filter cake is pasted with 5 parts of sodium dinaphthylmethane disulfonate, and the paste is evaporated to dryness.

The water-soluble vat dystuff of the formula so obtained dyes cotton and regenerated cellulose from a blue vat very level red tints that are fast to light, washing and soda-boiling.

What is claimed is:

1. 2-carboxybenzoylaminoanthraquinonyl-5:6 - phthaloylbenzthiazole.

2. The vat dyestuff of the formula

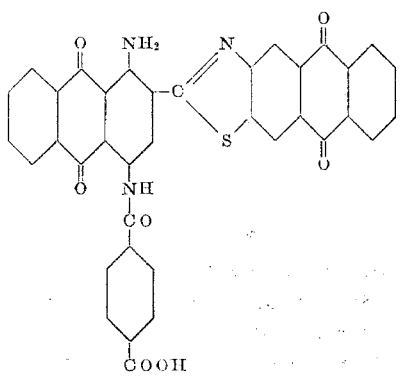

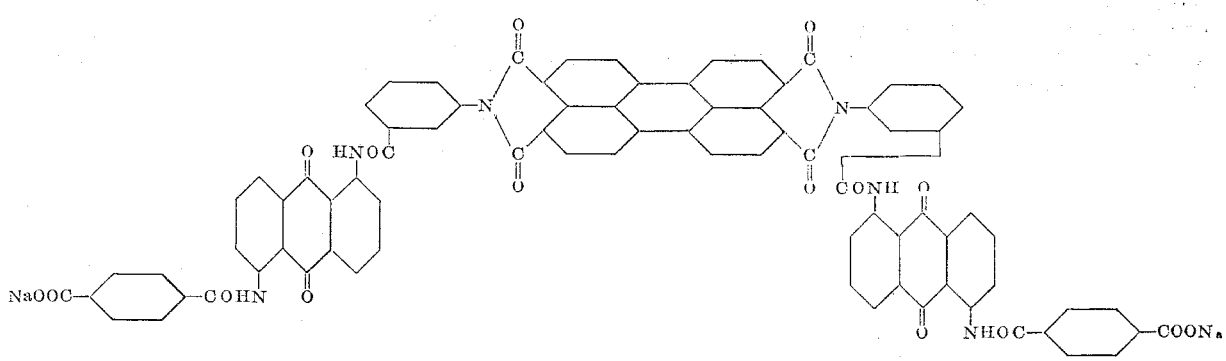

References Cited by the Examiner

UNITED STATES PATENTS

| | | | |
|---|---|---|---|
| 2,049,189 | 7/1936 | Beard | 260—368 |
| 2,204,970 | 6/1940 | Rentelman | 260—303 |
| 2,206,128 | 7/1940 | Schlichting | 260—303 |
| 2,449,011 | 9/1948 | Scalera et al. | 260—368 |
| 2,508,814 | 5/1950 | Coffey et al. | 260—368 |
| 2,555,713 | 6/1951 | Sutter et al. | 260—368 |
| 2,567,132 | 9/1951 | Stilmar | 260—368 |
| 2,567,822 | 9/1951 | Moergeli | 260—316 |
| 2,719,839 | 10/1955 | Dienet | 260—303 |
| 2,853,492 | 9/1958 | Grelat et al. | 260—316 |
| 2,870,172 | 1/1959 | Schoenauer | 260—368 |
| 2,905,685 | 9/1959 | Eckert et al. | 260—281 |
| 2,919,284 | 12/1959 | Caliezi | 260—351 |
| 2,945,866 | 7/1960 | Caliezi | 260—351 |
| 3,045,019 | 7/1962 | Bosshard | 260—281 |

FOREIGN PATENTS 1,021,398  12/1952  France.

ALEX MAZEL, *Primary Examiner.*

IRVING MARCUS, *Examiner.*

DON M. KERR, ALTON D. ROLLINS,
*Assistant Examiners.*